ROBERTS & HARTZELL.
Fruit-Gatherer.
No. 60,249.            Patented Dec. 4, 1866.
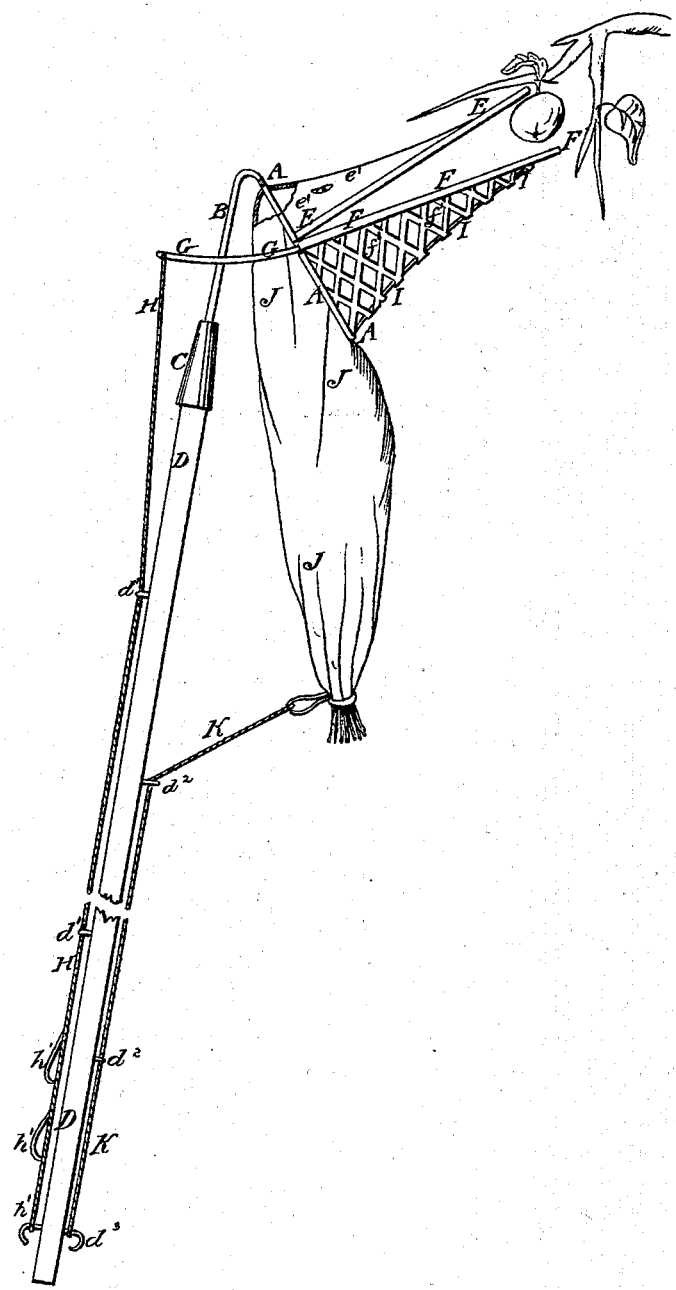
Witnesses:
Theo. Tusch
J. A. Service
Inventor:
C. R. Roberts.
J. S. Hartzell.
Per Munn & Co.
Attys.

United States Patent Office.

IMPROVEMENT IN FRUIT GATHERERS.

C. R. ROBERTS AND J. S. HARTZELL, OF ADDISON, PENNSYLVANIA.

Letters Patent No. 60,249, dated December 4, 1866.

SPECIFICATION.

TO ALL WHOM IT MAY CONCERN:

Be it known that we, C. R. ROBERTS and J. S. HARTZELL, of Addison, in the county of Somerset, and State of Pennsylvania, have invented a new and useful Improvement in Fruit Harvester; and we do hereby declare that the following is a full, clear, and exact description thereof, which will enable others skilled in the art to make and use the same, reference being had to the accompanying drawing, forming part of this specification.

The figure is a side view of our improved fruit harvester.

Our invention has for its object to furnish an improved instrument by means of which apples, pears, peaches, and other fruit may be gathered from the tree rapidly, conveniently, and without bruising or injuring the fruit. And it consists of an improved fruit harvester, formed by the combination and arrangement of a movable jaw, lever, cords, receiving sack, stationary jaw, ring, shank, and socket with each other, as hereinafter more fully described.

A is an oval or round ring, to the upper part of which is rigidly attached the shank B. To the lower end of the shank B is attached a socket, C, into which the end of the pole or handle D is inserted. E is the upper or stationary loop or jaw, the ends of which are rigidly attached to the sides of the ring A. F is the movable jaw or loop, the arms of which are pivoted to the sides of the ring A just below the points at which the ends of the loop or jaw E are attached to said ring. G is the lever, by means of which the jaw F is closed to grasp the fruit. The ends of the lever G are attached to the arms of the movable loop or jaw F, or they may be a continuation of said arms to the rear of the said ring A. To the lever G, in the rear of the shank B, is attached the end of the cord H, which passes down along the side of the pole or handle D, and is kept in place by passing through eyes or staples $d^1$ attached to said pole or handle. Upon the lower part of the cord H are formed loops $h'$, through which the hand may be placed, and the jaw F operated by moving the hand up or down along the pole or handle D. The loops or jaws, E and F, are covered with leather, rubber, or some textile material, and the space $e'$ between the arms of the stationary loop or jaw E and the upper part of the ring A is covered with the same or similar material. The space between the arms of the movable jaw or loop F is covered with a net-work, $f'$, of leather, or some textile material, so that the operator may see through the said net-work whether the fruit is in the proper position within the jaws E and F before pulling upon the instrument to separate the said fruit from the tree. I is a spring extending from the forward end of the loop or jaw F to the lower part of the wing A, which, by its elasticity, holds the said jaw or loop F away from the jaw or loop E, except when they are drawn together by operating the cord H. This spring may be an elastic cord or a coiled wire spring, as may be most convenient. J is the receiving sack, the upper end or mouth of which is attached to the ring A. K is a cord attached to the end of the sack J, and which passes down along the pole or handle D, being kept in position by passing through eyes or staples $d^2$ attached to said pole or handle, and it is secured in any required position by attaching its lower end to a hook $d^3$ attached to the lower part of said handle D. By means of the cord K the sack J may be adjusted as required by the various positions of the instrument in gathering the fruit and in depositing it where desired.

We claim as new, and desire to secure by Letters Patent—

An improved fruit harvester, formed by the combination of the movable jaw F, lever G, cords H and K, receiving sack J, stationary jaw E, ring A, shank B, and socket C, when said parts are constructed and arranged substantially as herein shown and described.

CHARLES R. ROBERTS,
JUDSON S. HARTZELL.

Witnesses:
A. MARSHALL ROSS,
JAMES T. WATSON.